United States Patent [19]

Marino

[11] E Re. 29,810

[45] Reissued Oct. 24, 1978

[54] ANALYZER FOR MULTI-CYLINDER INTERNAL COMBUSTION ENGINE HAVING MEANS FOR IDENTIFYING INDIVIDUAL CYLINDERS

[75] Inventor: Joseph A. Marino, Eden Prairie, Minn.

[73] Assignee: Applied Power Inc., Milwaukee, Wis.

[21] Appl. No.: 342,966

[22] Filed: Mar. 20, 1973

Related U.S. Patent Documents

Reissue of:

[64] Patent No.: 3,572,103
Issued: Mar. 23, 1971
Appl. No.: 607,820
Filed: Jan. 6, 1967

[51] Int. Cl.[2] ..... G01M 19/02

[52] U.S. Cl. ..... 73/117.3; 324/16 R; 324/19

[58] Field of Search ..... 73/116, 117.3; 324/16 R, 16 T, 16 S, 19

[56] References Cited

U.S. PATENT DOCUMENTS

| | | | |
|---|---|---|---|
| Re. 26,163 | 2/1967 | Heyer | 324/19 |
| 2,355,363 | 8/1944 | Christaldi | 324/16 |
| 2,518,427 | 8/1950 | Lindberg | 324/16 |
| 2,809,344 | 10/1957 | Mayer | 324/19 |
| 2,986,032 | 5/1961 | Heyer | 73/116 |
| 3,035,438 | 5/1962 | Hale | 324/15 |
| 3,186,218 | 6/1965 | Hollis | 73/116 |
| 3,274,486 | 9/1966 | Gould | 324/16 |

*Primary Examiner*—Jerry W. Myracle
*Attorney, Agent, or Firm*—Frederick E. Lange

[57] ABSTRACT

An analyzer for multicylinder internal combustion engines in which there is an electronic counter triggered by pulses from the ignition system and normally reset by the firing voltage applied to any of selected spark plugs in which the electronic counter has a plurality of stages corresponding to the number of cylinders in the engine and in which there is an electrical testing means adapted to be operated by the output signal of any one or more stages of the counter to produce an electrical effect for analyzing the performance of the engine.

25 Claims, 3 Drawing Figures

INVENTOR
JOSEPH A. MARINO
BY Frederick E. Lange
ATTORNEY

INVENTOR.
JOSEPH A. MARINO
BY Frederick E. Lange
ATTORNEY

ANALYZER FOR MULTI-CYLINDER INTERNAL COMBUSTION ENGINE HAVING MEANS FOR IDENTIFYING INDIVIDUAL CYLINDERS

Matter enclosed in heavy brackets [ ] appears in the original patent but forms no part of this reissue specification; matter printed in italics indicates the additions made by reissue.

BRIEF SUMMARY OF THE INVENTION

In the analysis of the performance of multicylinder internal combustion engines, it is desirable to separately analyze the performance of each cylinder of the internal combustion engine. This can be done in several ways. It is desirable, for example, to selectively render each cylinder ineffective and to observe the effect on the over-all performance of rendering that cylinder ineffective. It is also desirable to individually indicate the voltage appearing across the igniter, commonly a spark plug. If the spark plug, for example, is shorted, then the voltage across the plug will be relatively low. If the spark plug gap is such that no firing takes place across the spark plug, then the voltage appearing across it will be high.

It is also important in analyzing the performance of an internal combustion engine to measure the "dwell" of the cam which operates the ignition points. The so-called "dwell" is a measure of time that the points are closed.

Various arrangements have been devised in the past for measuring each of the conditions discussed above. These arrangements have all had the drawback of either requiring certain special conditions such as, maintain the engine at constant speed or requiring an excessive number of connections. In some cases, the measurement of the conditions has been accomplished by the provision of a special generator attached to or driven by the main drive shaft.

An object of the present invention is to provide an engine analyzer for a multicylinder internal combustion engine in which very simple connections to the ignition system are required for individually analyzing the performance of the different cylinders of the engine and in which the apparatus is capable of individually identifying the particular cylinder in which the spark plug is being fired, regardless of the speed at which the engine is operated.

A further object of the present invention is to provide such an apparatus which is extremely compact and can be located at a point conveniently accessible to the mechanic testing the engine.

A further object of the invention is to provide an apparatus which can be employed to test any one of a number of conditions such as when one or more spark plugs are shorted, the voltage across any individual plug, the average voltage across the plugs, the average dwell time, or the dwell time for any individual cylinder.

A further object of the invention is to provide a signal identifying the particular cylinder in which the spark plug is being fired which signal is initiated at the time that the ignition points first close and continues until they reclose so that testing apparatus controlled thereby can be employed for accurately measuring conditions arising as soon as the points open.

A further object of the invention is to provide such an apparatus in which the spark plugs in any number of selected cylinders can be shorted at the same time.

A further object of the invention is to provide such an apparatus in which the spark plug of one cylinder is used as a reference and in which the apparatus continues to operate even when this reference spark plug is being shorted for test purposes.

A further object of the invention is to provide such an apparatus in which the apparatus provides an indication of the speed of the engine so that, for example, the effect of shorting the spark plug in any one or more cylinders can be readily observed.

Very broadly, I accomplish the objects of the invention by providing a counter which is pulsed each time that an ignition pulse is produced. The counter is reset by means of a connection to a selected igniter so that each time this igniter is energized, the counter starts over again. In its specific form, I employ an electronic ring counter in which each pulse applied to one of the input terminals causes the output of the counter to advance to another stage. By selectively connecting the outputs of one or more stages to control apparatus, it is possible to control the analyzer in accordance with whether any one or more cylinders are in the firing portion of their cycle. Where the igniter which controls the reset pulse is itself being shorted out, auxiliary means is effective to reset the counter at the end of each cycle of engine operation.

Further objects of the invention will be apparent from a consideration of the accompanying specification, claims and drawing.

DETAILED DESCRIPTION

Figure 1:
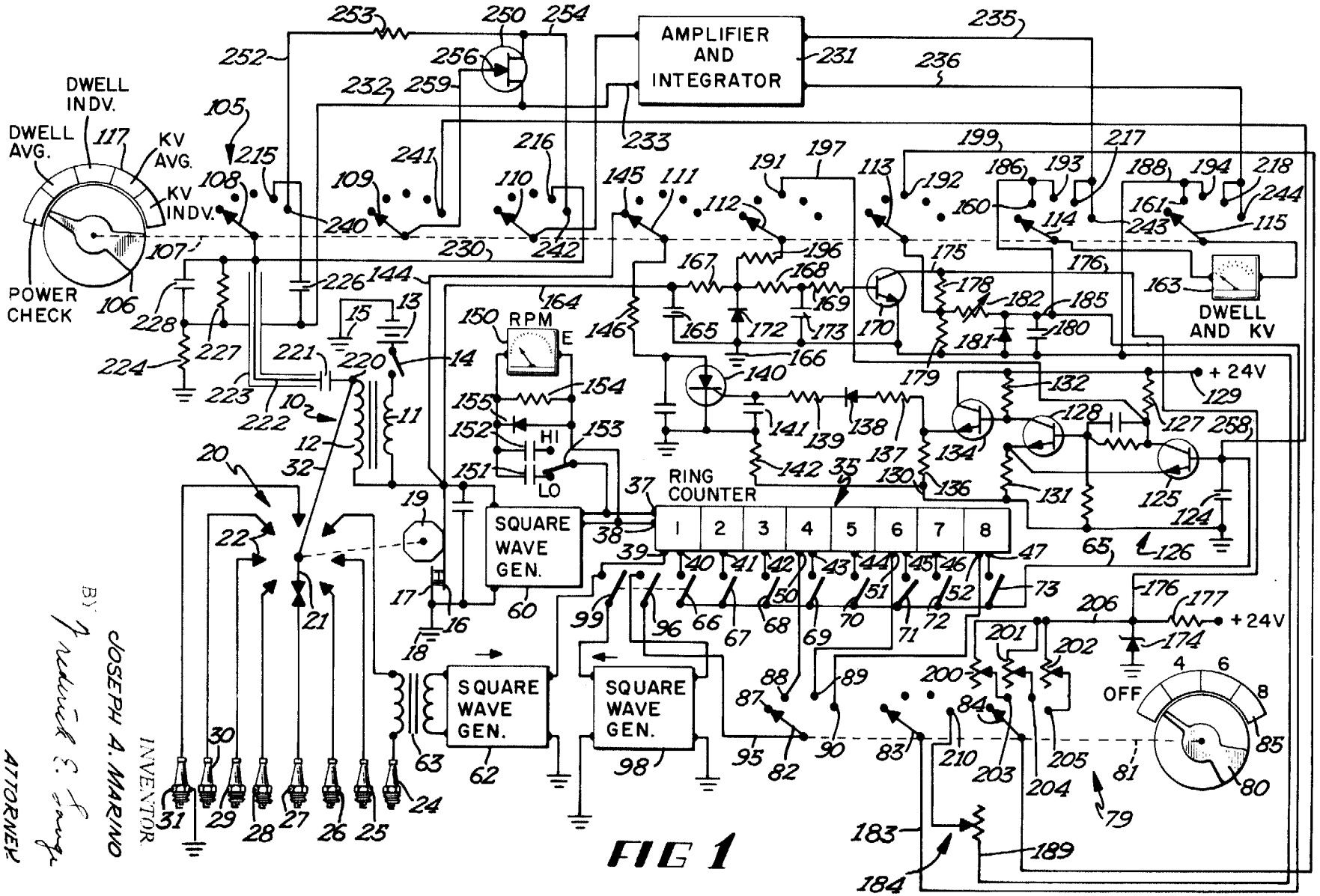
FIG. 1 is a schematic view of my engine analyzer.

Referring to FIG. 1, I have shown the apparatus as connected to an automobile ignition system which is schematically shown in the drawing.

Referring first to the automobile ignition system, the numeral 10 indicates the usual ignition coil having a low voltage primary winding 11 and a high voltage secondary winding 12, the low voltage primary winding 11 being connected to the positive terminal of the automobile battery 13 through some switch such as an ignition switch 14. The opposite terminal of battery 13 is connected to ground at 15. The lower terminal of the primary winding 11 is connected to the switch blade 16 which cooperates with switch blade 17 to form the conventional breaker points. Switch blade 17 is grounded at 18. Cooperating with switch blade 16 is an eight-sided cam 19 which serves to separate switch blades 16 and 17 eight times for each revolution of cam 19. The numeral 20 indicates the conventional distributor having a distributor arm 21 which is driven by the engine along with the cam 19 and which sequentially makes contact with a plurality of terminals 22, each of which is connected to a different one of the igniters 24–31, which igniters normally take the form of the conventional spark plugs. The various igniters 24–31 are associated with respective cylinders, igniter 24 being associated with cylinder No. 1, for example. While I have shown the igniters or spark plugs as located in a continuous row, it is to be understood that they are associated with the cylinders in such a manner as to produce the desired firing sequence. The rotative arm 21 of the distributor 20 is connected in the conventional manner to the high tension side or upper terminal of coil 12 through a conductor 32. Upon rotation of the distributor 20, the voltage across coil 12 is successively applied to the various igniters or spark plugs in the desired firing sequence.

Turning now to the improved engine analyzer, this employs an electronic ring counter designated generally by the reference numeral 35. The ring counter is shown in detail in FIG. 3 and will be subsequently described in more detail. For the purposes of explaining the apparatus of FIG. 1, however, the ring counter will be merely described in general terms. It will be noted that this ring counter comprises eight stages which have been labeled with the numerals 1–8. Stage 1 is provided with a pair of input terminals 37 and 38 and a reset input terminal 39. Each of the stages 1–8 has an output terminal which has been designated in connection with the respective stages by the numerals 40–47, respectively. In addition, the stages 4, 6 and 8 are provided with auxiliary output terminals 50, 51 and 52, respectively. Each time that a pulse input signal is applied between terminals 37 and 38, the output signal advances from one of the stages to the next stage. Thus, assuming that an output signal appears on output terminal 40 of stage 1 and a pulse is applied between terminals 37 and 38, the output signal moves to terminal 41 of stage 2 and is removed from terminal 40 of stage 1. The next pulse is applied between terminals 37 and 38 and causes the output signal to be applied to terminal 42 of stage 3 and is removed from terminal 41 of stage 2. This operation continues until the output voltage appears, in the case of an eight cylinder engine, at terminal 47 of stage 8. Whenever a signal is applied to the reset terminal of stage 1, the entire counter is reset so that the output voltage again appears across terminal 40 of stage 1 so that the counter can again repeat its counting operation. As will be presently explained, input terminals 37 and 38 are connected across the distributor switch or "points" so that a pulse is applied each time a signal is applied to any of the plugs or igniters. The reset signal applied to terminal 39 is derived from the connection between the distributor and any selected plug so that whenever the selected plug is to be fired, the ring counter is reset. By always having the ring counter start its counting operation with the firing cycle of a particular plug, such as the plug for the "No. 1" cylinder, and by successively advancing the counter each time that the points open and close, it is possible to at all times know what cylinder is in the firing portion of its cycle, because the output of the counter will appear across a stage corresponding to the particular plug or igniter that is ready to be fired at that time. As will also be described in more detail, provision is made when the reference plug is being short-circuited for testing purposes to reset the ring counter whenever a complete cycle has been completed.

Referring now in more detail to the connections of the ring counter to the ignition system, it will be noted that the input terminals 37 and 38 of the ring counter are connected to the output terminals of a square wave generator 60, the input terminals of which are connected across the points 16 and 17 of the ignition system and across the conventional condenser in parallel with these points. The [voltage] *ignition voltage pulses* derived across these points [is] *when the points open are* somewhat oscillatory in nature and in order to assure proper operation of the ring counter, [this voltage is] *these voltage pulses are* first filtered [and] *to derive smoother pulses therefrom which are* then applied to a square wave generator, such as a conventional Schmitt trigger. The result of the filtering and passage of the [filter] *filtered* signal through the Schmitt trigger is to supply to the input terminals 37 and 38 a voltage consisting of a series of negative square waves, each square wave corresponding to the closing of the points 16 and 17. Thus, a *negative* pulse is applied to terminals 37 and 38 each time that a voltage is to be applied to one of the igniters, *such pulse occurring at the time of closing of the points and hence being delayed from the time the points open to produce the ignition pulse by a period of time substantially equal to the time the points remain open. This, of course, is directly proportional to the interval between successive ignition pulses.*

Referring now to the connection to the reset terminal 39, it will be noted that this terminal is connected to the output terminal of another square wave generator 62 which is similar to square wave generator 60. *In other words, the generator 62, like generator 60, includes filter means and a square wave generator such as a Schmitt trigger.* The input of this square wave generator is in turn connected to the secondary of a transformer 63 having a relatively low impedance primary connected into the connection between the distributor and plug [34] *24* which, as pointed out above, may be the plug for the No. 1 cylinder. It is to be understood that in actual practice, the transformer 63 will be incorporated into the coupling cable extending from the distributor to the spark plug lead and the primary of transformer 63 will be coupled into the connection between the distributor and the spark plug 24 by disconnecting the normal spark plug lead and inserting the primary between the spark plug lead and the spark plug. The effect of this connection and the filter and Schmitt trigger embodied in the square wave generator is to result in a negative square wave pulse being applied to the reset terminal 39 each time that a firing voltage *pulse* is applied to plug 24. By resetting the counter each time that a firing pulse is applied to a particular plug such as the plug for the No. 1 cylinder and then by advancing the ring counter one stage at a time each time that the points are reclosed, it will be obvious that the stage at which the output voltage appears always has a definite relationship to the cylinder that is to be fired at that particular time. As will be presently explained, by connecting the apparatus to the output terminal of a particular stage, it is possible to control the apparatus in accordance with the firing of a particular cylinder.

Figure 2:
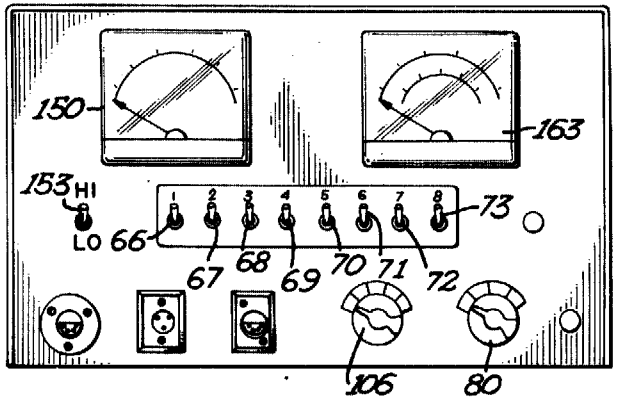
FIG. 2 is a drawing of the front panel of the analyzer.

An output conductor 65 is connected to a series of switches 66–73. By closing any one of these switches, the output of a particular stage is connected to the conductor 65. Thus, by closing switch 67, for example, the output of stage 2 is connected to conductor 65; by closing switch 70, the output of stage 5 is connected to conductor 65; and so forth. As will be pointed out in connection with the operation, it is possible to close a number of switches simultaneously where it is desired to perform certain testing operations in connection with several cylinders at once. As will be noted in FIG. 2, these switches 66–73 are toggle switches which are located on the front of the control panel so as to be readily accessible to the operator.

As previously mentioned, one of the tests which is possible with the present apparatus is that of effectively short-circuiting any given igniter or any combination of igniters. As previously pointed out, the reset signal applied to reset terminal 39 is normally derived from the connection to the spark plug 24 which is associated with, for example, the No. 1 cylinder. It will be fairly obvious that if this igniter is being short-circuited, the voltage across it will cease to exist and except for the initial power supplied by it before the apparatus controlled by the counter becomes effective to short-circuit it, voltage pulses from this igniter are not available as long as this particular spark plug is being short-circuited. It is accordingly necessary to provide other means for resetting the counter under these conditions. Very generally, this is accomplished by connecting an output of the stage corresponding to the last of the cylinders to be fired, to the reset terminals so as to reset the counter whenever the engine has gone through a complete cycle. This, of course, requires that some means be provided for distinguishing whether the engine is a four, six or eight-cylinder engine. This is accomplished by a cylinder selector switch 79 having a knob 80 connected by a shaft 81 to a plurality of selector switch blades 82, 83 and 84. The knob 80 has a pointer cooperating with a scale 85 divided into four segments labeled "Off," "4," "6" and "8." The switch blade 82 has four corresponding contact making positions, blade 82 cooperating with a "dead" contact 87 and three other contacts 88, 89 and 90. Contact 88 is connected to auxiliary output terminal 50 of stage 4, contact 89 with auxiliary output terminal 51 of stage 6 and contact 90 with auxiliary output terminal 52 of stage 8. The switch blade 82 is positioned by knob 80 and assumes the position shown when the knob 80 is in the "Off" position shown. When the knob is moved so that its indicator is adjacent either the "4," "6" or "8" segments, the switch blade 82 is in engagement with either contact 88, contact 89 or contact 90. Thus, for example, when knob 80 is in positon "4," switch blade 82 is in engagement with contact 88 and is electrically connected to the output termnal 50 of stage 4. Similarly, if knob 80 is in either the "6" or "8" positions, the switch blade 82 is electrically connected to terminal 51 of stage 6 of terminal 52 of stage 8.

Switch blade 82 is in turn electrically connected through a conductor 95 and a switch 96 to the input of a square wave generator 98 similar in function to the square wave generator 60. In other words, the voltage from the selected output stage 4, 6 or 8 (if knob 80 is in the "4," "6" or "8" positions) is first filtered and then converted into a square wave output in the square wave generator 98. The output terminal of square wave generator 98 is in turn connected through a further switch 99 to the reset terminal 39 of stage 1. It is to be understood that switches 96 and 99 are mechanically connected to switch 66 so that when manual switch 66 is closed to connect the output of stage 1 with the conductor 65, switches 96 and 99 are closed to connect the switch blade 82 with the input of the square wave generator and connect the output of the square wave generator to the reset terminal. Thus, when switch 66 is closed, and knob 80 of cylinder selector switch is in the "4," "6" or "8" position, an output of one of stages 4, 6 and 8 is passed through the square wave generator and used to reset the ring counter. It is, of course, understood that the knob 80 is turned to a position corresponding to the number of cylinders in the engine being tested. Thus, under these conditions, the ring counter is reset each time that the engine has gone through a complete cycle so that even if the plug of the No. 1 cylinder is being effectively short-circuited the ring counter is still reset at the end of every cycle.

The various tests to be performed are controlled by a selector switch indicated in its entirety by the reference numeral 105. This switch comprises a knob 106 connected by a shaft 107 to a plurality of switch blades 108–115. The knob 106 and the switch blades 108–115 have five possible positions. It will be noted that the knob 106 has a pointer which cooperates with a scale 117 having five segments labeled "Power Check," "Dwell Avg.," "Dwell Indv." "KV Avg." and "KV Indv." The "Power Check" position, as will be presently explained, is the position in which the knob is set when it is desired to selectively short-circuit the various igniters or spark plugs. The "Dwell Avg." position is the "dwell average" position in which position the average dwell of the distributor points is indicated. The third position labeled "Dwell Indv." is the dwell-individual position in which the dwell for any selected cylinder is indicated. The fourth position labeled "KV Avg." is the position in which the knob is placed when it is desired to measure the average voltage across the plugs, the legend "KV Avg." standing for kilovolts-average. The final position labeled "KV Indv." is the position in which the knob is placed when it is desired to measure the voltage across the individual igniters.

POWER CHECK

It will be noted that knob 106 is in the position labeled "Power Check," that is, the position in which it is possible to selectively short various igniters or spark plugs. The apparatus for performing this function will now be described. Conductor 65, which as previously pointed out, can be selectively connected to the output terminals of any of the stages 1–8 of the ring counter, is connected to the base of an NPN transistor 125 of a conventional Schmitt trigger circuit 126. A capacitor 124 is connected across the input to transistor 125 to filter out any high frequency components in the output of the ring counter stages. The Schmitt trigger 126 comprises the transistor 125 and a second NPN transistor 128 which are connected between a line 129 leading to the positive terminal of a direct current source of power, such as a 24-volt source, and conductor 130 connected to ground. The Schmitt trigger 126 is conventional and will not be described in detail except to point out that the transistor 125 is initially nonconductive and the transistor 128 conductive. Upon a positive voltage being applied through conductor 65 to the base of transistor 125, current flows through the collector-emitter circuit of transistor 125. This will make the potential of the collector less positive and this drop in potential is transmitted to the base of transistor 128 to cause it to become nonconductive. This, in turn, reduces the current flow through resistor 131 to lower the potential of the emitter of transistor 125 to cause transistor 125 to become more conductive. Thus, transistor 125 abruptly becomes conductive and transistor 128 nonconductive in the conventional manner of a Schmitt trigger circuit.

A resistor 132 connected between the positive lead 129 and the collector of transistor 128 is connected between the collector and base of a further NPN transistor 134. As long as transistor 128 was conductive, the voltage drop across resistor 132 maintained the base of transistor 134 at a sufficiently low potential with respect to the emitter of that transistor that the transistor 134 was nonconductive. As soon as transistor 128 of the Schmitt trigger becomes nonconductive, however, the base tends to assume a potential close to that of the positive lead 129 with the result that current flows through the collector-emitter circuit of transistor 134 and in turn through resistor 136. The upper terminal of resistor 136 is connected through a resistor 137, a rectifier 138 and a further resistor 139 to the trigger electrode of a silicon controlled rectifier 140 having a capacitor 141 connected between the trigger electrode and cathode thereof and in series with the resistor 142. Upon the appearance of a voltage across resistor 136 due to the conduction of transistor 134 in the manner previously described, the steady state portion of this voltage is applied between the trigger electrode and the cathode of SCR 140 to cause the same to become conductive while a voltage exists across the anode and cathode of SCR 140. Such a voltage is applied whenever the points are open, the voltage across the points being applied through the following circuit; from the upper terminal of switch 16 through a conductor 144, a switch contact 145 of the test selector switch 105, switch blade 111, a resistor 146, the anode-cathode circuit of SCR 140 and through ground back to the lower terminal of the other switch 17 of the distributor points. This voltage is applied while the points are open. As soon as they close, the voltage across the points drops to a minimal value so that no appreciable voltage is applied between the anode and cathode and the SCR ceases to conduct. This resistor 146 is a very small resistor, being only two ohms in value in one embodiment, so that the points are effectively short-circuited.

From the above, it will be apparent that whenever a voltage is applied to conductor 65, the SCR 140 becomes conductive to short-circuit the ignition points 16 and 17 while the points are open. As previously explained, a voltage is applied to conductor 65 whenever an output voltage appears at one of the stages 1–8 of the ring counter and the corresponding one of the switches 66–73 is closed. Thus, for example, assuming that switch 67 is closed, a pulse appears upon conductor 65 whenever the igniter associated with the cylinder cooresponding to stage 2 of the ring counter is ready to be fired. This pulse is effective through the Schmitt trigger 126 and the transistor 134 to cause the SCR to become conductive and to short the distributor points 16 and 17 as soon as these points open to normally cause a voltage to be applied to the associated spark plug. Hence, no voltage is applied to the plug or igniter of the cylinder corresponding to stage 2. It will be obvious that if switches 67, 68 and 69 are closed, for example, the SCR 140 will be conductive at the time when the spark plugs of the cylinders associated with stages 2, 3 and 4 are about to be fired so that these spark plugs will be shorted out. It is thus possible with the apparatus to short out any particular spark plug or any combination of spark plugs.

As previously explained; if the spark plug which is to be shorted out is the one from which the reset signal is derived, then the selector knob 80 is turned to a position correspondind to the number of cylinders in the engine being tested and when the output signal has reached the stage corresonding to the last cylinder in the cycle, the auxiliary output voltage of that stage is applied through the square wave generator 98 to the reset terminal 39 to reset the ring counter. Thus, even though the plug from which the reset pulse is normally derived is being shorted out, the ring counter continues to operate.

When one or more selected cylinders are rendered inoperative by shorting out the spark plug or spark plugs thereof, it is desirable to observe the effect upon engine operation. If a dynamometer is conveniently available, the test described above can be performed while on a dynamometer. The apparatus of my invention does, however, provide means for getting an indication of the effect on the engine of rendering one or more of the cylinders inoperative. This takes the form of a meter 150 which is calibrated in terms of revolutions per minute to act as a tachometer. The tachometer is energized by the output of the square wave generator 60 which, as previously pointed out, has its input connected across the ignition points 16 and 17 so as to receive a pulse each time that the ignition contacts are closed. The output of the square wave generator, as previously pointed out, is in the form of a series of square waves, one for each ignition pulse. The lower output terminal of the square wave generator 60 is directly connected to one side of the meter 150. The other output terminal of the square wave generator is connected through one or the other of two capacitors 151 and 152 to the opposite side of the meter. The connection through the capacitors is controlled by a "high-low" switch 153 shown in FIG. 2 on the front of the panel. Connected across the input to the tachometer is a resistor 154 and a rectifier 155. The capacitor 151 used for the low speeds has a relatively high capacitance while capacitor 152 used for high speeds has a relatively low capacitance. The capacitor 151 or 152, as the case may be, is connected in series with the resistor 154, to form a resistance capacitance circuit so that the current flowing through resistor 154 is dependent upon the frequency of the pulses. Due to the presence of the rectifier 155, the current flow in one direction is bypassed so that the voltage appearing across resistor 154 is a unidirectional voltage, the magnitude of which is dependent upon the frequency of the pulses and hence upon the speed of the engine. It is to be understood that the tachometer 150 is provided with two scales, one for the high engine speeds and the other for lower engine speeds, one scale or the other being read, depending upon the position of the "high-low" switch 153. With the apparatus, it is accordingly possible to observe the speed of the engine at all times and to observe the effect upon this speed of rendering one or more cylinders ineffective. As is well known in the art, if the engine does not drop sufficiently in speed upon one of the cylinders being rendered ineffective, this indicates either a lack of compression in that cylinder or some fault in the ignition. By means of the subsequent tests to be described, it is possible to determine whether the ignition is functioning properly and thus to determine whether the fault is in the compression or in the ignition system.

AVERAGE DWELL

The apparatus which is involved when the knob 106 of the test selector switch 105 is turned to the "Dwell Avg." position will now be considered. When the knob 106 is so turned, switch blades 108 through 115 are turned to where they each engage the next contact to the right of the one with which they are shown in engagement in the drawing. Referring specifically to switch blades 114 and 115, these are now moved into engagement with contacts 160 and 161, respectively. The other switch blades 108–113 are moved to corresponding positions.

Switch blades 114 and 115 are connected to the opposite terminals of a meter 163 which is provided with two scales, one to indicate dwell and the other to indicate the voltage in kilovolts. The circuit for energizing the meter under these conditions will now be considered. Basically, the dwell is determined by measuring the relative amount of time the ignition points are closed. Very broadly, the voltage across the points is measured and amplified, then integrated, the integrated voltage being applied across the dwell meter 163. To accomplish this, a conductor 164 leads to one terminal of a capacitor 165 connected between the conductor 164 and ground at 166. Thus, the voltage across the ignition switches 16 and 17 is applied across capacitor 165. The capacitor 165 is provided merely for the purpose of filtering very high frequency components of the signal across the points. The signal is then passed through resistors 167, 168 and 169 to the base of an NPN transistor 170. Connected between resistors 167 and 168 and ground is a rectifier 172 which acts to shunt out any negative components of the signal across the points. Connected between resistors 168 and 169 and ground is a further capacitor 173 which further acts to filter out high frequency components in the signal across the ignition points. The collector of transistor 170 is connected through conductors 175 and 176 to one terminal of a Zener diode 174 which is connected through a resistor 177 to a positive terminal of a direct current source of potential which terminal may be, for example, at plus-24 volts. The opposite terminal of Zener diode 174 is connected to ground so that the upper terminal is maintained at a constant voltage with respect to ground. The transistor 170 is nonconductive while the points are closed due to the fact that no voltage is applied to the base of the transistor during this period. Upon a positive pulse, however, being applied from across the points due to the points opening, the base potential is abruptly raised with respect to the emitter causing a marked increase in current flow through the transistor and hence a drop in the output voltage. Connected across the output terminals of transistor 170 between conductor 175 and ground are a pair of resistors 178 and 179. These resistors act as a voltage divider. The portion of the voltage drop occurring across resistor 179 is applied across a capacitor 180 of relatively large capacitance such as 1000 microfarads. Connected in parallel with the capacitor is a diode 181. A variable resistor 182 is connected between the upper terminal of resistor 179 and the upper terminal of capacitor 180 for initial adjustment of meter 163, as will be pointed out later. It will be obvious from the foregoing that each time a pulse appears across the ignition points 16 and 17, this pulse being applied to the base of transistor 170 causes a very substantial reduction in the voltage drop across resistor 179. Each time that the points are closed, the voltage drop increases. Thus, during the dwell of the cam, that is when the ignition points are closed, a greater current voltage appears and during the time the points are open, the voltage drops abruptly. Due to the resistance-capacitor circuit including variable resistor 182 and capacitor 180, the capacitor 180 assumes a charge dependent upon the relative length of time that the points are in their dwell condition. The charge across capacitor 180 is applied across meter 173, the upper terminal of capacitor 180 being connected through conductors 185 and 186 to switch contact 160 which, as previously pointed out, is connected to one terminal of the meter 163. The lower terminal of capacitor 180 is connected through conductors 187 and 188 to switch terminal 161 which, as previously pointed out, is connected to the opposite terminal of meter 163.

It will be obvious from the foregoing that when the test selector switch 105 is in the position in which the pointer is pointing to the position "Dwell Avg.," the capacitor 180 assumes an average charge dependent upon the time that the points are closed with respect to the time they are open. The meter 163 will hence read the average time that these points are in dwell position with respect to the average time that they are open as far as a complete cycle of engine operation is concerned.

The variable resistor 182 along with a further variable resistor 184 are employed for adjusting the reading of the meter 163 to take care of the different numbers of cylinders. The average dwell reading will obviously be somewhat different if the equipment is used on an eight-cylinder engine than if it is used on a four-cylinder engine. The variable resistor 184 is adapted to be connected in parallel with the resistor 179 of the voltage divider when knob 80 of the cylinder selector switch 79 is turned to the eight-cylinder position. It will be noted that the slider of variable resistor 184 is connected to a contact 210 with which the switch arm 83 is in engagement when the cylinder selector switch is in this position. The switch arm 83 is connected through conductors 183 and 185 and variable resistor 182 to the upper terminal of resistor 179 while the lower terminal of variable resistor 184 is connected through conductor 189 to the lower terminal of resistor 179. It will readily be seen that since variable resistor 184 is connected in parallel with resistor 179 of the voltage divider, any change in the value of resistor 184 varies the portion of the voltage across the emitter-collector circuit of transistor 170 that is applied across capacitor 180. Similarly, varying the value of variable resistor 182 varies the portion of the voltage drop across resistor 179 that is applied across capacitor 180. In calibrating the meter 163, the variable resistor 182 is used to adjust the meter when the equipment is being used with a six-cylinder engine. The adjustment is made by comparing the reading of the meter with that obtained on a standard meter and by adjusting resistor 182 until the two readings coincide. When the equipment is being used on an eight-cylinder engine, the selector knob 80 is turned to position "8" in which resistor 184 is connected in parallel with resistor 179 of the voltage divider. Resistor 184 is now adjusted until the meter 163 correctly indicates the average dwell.

It has been found that only one means for adjusting the average dwell reading is necessary for both four and six-cylinder engines since any difference in the effect on average dwell in changing from four to six cylinders is compensated for by the difference in scales. The scale for dwell actually consists of two individual scales, one for four and eight cylinder engines and the other six cylinder engines, these two individual scales being calibrated differently.

DWELL INDIVIDUAL CONDITION

When it is desired to measure the amount of dwell for any individual cylinder, the knob 106 of the test selector switch 105 is turned until the pointer of knob 106 points to the position indicated by the legend "Dwell Indv." When this happens, all of the switches 108-115 are turned to the position in which they extend vertically, as shown in the drawing to engage the intermediate one of the five contacts. The switch blade 112 will be moved into engagement with the contact 191, switch blade 113 into engagement with the contact 192. Similarly, switch blades 114 and 115 will be moved into engagement with contacts 193 and 194, respectively. Contact 193 is connected to contact 160 and contact 194 to contact 161 so that when, as far as switch blades 114 and 115 are concerned, the effect of moving these switch blades into engagement with contacts 193 and 194 is the same as that previously described when they are moved into engagement with contacts 160 and 161. In other words, the effect of this movement of switch blades 114 and 115 is to connect the meeter 163 between contacts 193 and 194 which, like contacts 160 and 161, are connected across the output of the integrating capacitor 180 referred to previously.

The fundamental difference between the apparatus employed for measuring the individual dwell and that employed for measuring the average dwell is that when the individual dwell is being measured, no appreciable voltage is applied to capacitor 180 since the transistor 170 is held in a continuous fully conductive state except when an output pulse is received from the stage corresponding to the cylinder which is being tested. It is only when this output pulse is received is it possible for the voltage pulse across the points to have any effect upon the operation of the transistor and hence upon the charge on the capacitor 180. A further difference in the apparatus when the dwell individual measurement is being made is that it is necessary to compensate substantially for whether the engine is a four, six or eight-cylinder engine.

Referring to the specific apparatus, reference has already been made to switch blade 112 being moved into engagement with contact 191. The effect of this is to establish a connection from the junction of resistors 167 and 168 in the connection leading to the base of transistor 170, through resistor 196, switch blade 112, contact 191, and conductor 197 to the lower terminal of resistor 127 in the connection between the positive lead 129 and the emitter of transistor 125. As previously pointed out, transistor 125 is normally nonconductive except when a pulse is being received from one of the stages of the ring counter. Consequently, the potential at the lower terminal of resistor 127 is relatively high so that a strong positive potential is applied through the connection just traced to the junction of resistors 167 and 168 and hence to the base of transistor 170. This strong positive potential causes the transistor 170 to become highly conductive so that the voltage drop across resistors 178 and 179 is relatively small and so that any pulses appearing across the ignition points 16 and 17 have no effect upon the conductivity of transistor 170 as long as the voltage just traced is applied to the base of transistor 170. When, however, one of the switches 66–73 is closed so as to apply a voltage pulse to conductor 65 at a time corresponding to the time of firing of the selected cylinder, this voltage causes transistor 125 of the Schmitt trigger to abruptly become highly conductive, causing a very substantial voltage drop to appear across resistor 127. The result is that the potential at the lower end of resistor 127 which in turn is transmitted through to the base of transistor 170 drops abruptly and approaches ground potential. It is now possible for a voltage pulse derived from the voltage across ignition points 16 and 17 to increase the conductivity of transistor 170 to produce the effect previously described. Thus, when switch blade 112 is in engagement with contact 191 as a result of knob 106 being moved to the "Dwell Indv." position, the effect of a voltage pulse is felt by capacitor 180 only when the selected cylinder is about to have its igniter fired. In other words, the dwell for that selected cylinder is the only one that is affecting the voltage across capacitor 180 and hence the reading of meter 163.

Where the dwell of only one cylinder is being measured, a pulse is being received less frequently than when the average dwell is being measured. Consequently, it is necessary to compensate for this in the integrating circuit. This is done by connecting different size resistors in parallel with resistor 178 to increase the proportion of the total voltage across transistor 170 which appears across resistor 179 in parallel with capacitor 180. Referring to switch 113, it will be noted that a circuit can be traced from the junction of resistors 178 and 179 through switch 113, through contact 192, and conductor 199, to switch blade 84 of the cylinder selector switch controlled by knob 80. Regardless of whether knob 80 is in the four-cylinder, six-cylinder or eight-cylinder position, the switch 84 is in engagement with a contact which in turn connects with a variable resistor. These variable resistors designated by the reference numerals 200, 201 and 202 are connected respectively to contacts 203, 204 and 205 corresponding respectively to the four, six and eight-cylinder positions of knob 80. The upper ends of variable resistors 200, 201 and 202 are tied together and are connected to conductor 206 which in turn is connected through conductor 176 to the upper terminal of resistor 178. Thus, when knob 80 is in the four, six or eight-cylinder position, one of the resistors 200, 201 or 202 is connected in parallel with the resistor 178 to decrease the effective resistance between conductor 175 and the junction of resistors 178 and 179. The resistance of resistors 200, 201 and 202 will be so selected or adjusted that they will be of progressively decreasing value, that is the resistance of resistor 200 will be the highest and that of resistor 202 the lowest. This is due to the fact that where an eight-cylinder engine is being used, for example, the only pulse that is being measured occurs once in each eight pulses and it is obviously necessary for a greater portion of the voltage across transistor 170 to be applied across capacitor 180 and meter 163 under these conditions.

The apparatus is calibrated by selectively connecting the apparatus to four, six and eight-cylinder automobiles and adjusting the resistors 200, 201, and 202 until the readings on the meter 163 in each case give the correct dwell in degrees as measured by a previously calibrated meter or as observed on an oscilloscope.

APPARATUS FOR MEASURING AVERAGE VOLTAGE

If the knob 106 of the test selector switch 105 is moved to its fourth position, namely that in which the pointer on the knob is opposite to the legend "KV Avg.," the apparatus is effective to determine the average voltage existing across the various plugs. With the knob in this position, switch blades 108–115 are in the position in which switch blade 108 engages contact 215, switch blade 110 engages contact 216, and switch blades 114 and 115 engage contacts 217 and 218. The engagement of switch blades 114 and 115 with contacts 217 and 218 causes the meter 163 to be connected across contacts 217 and 218. As will be pointed out presently, the voltage across the plugs is applied under these conditions to contacts 217 and 218.

In order to derive a voltage dependent upon the voltage across the plugs, the voltage across coil 12 is measured. This is done by making a detachable connection to the top of the second ignition coil secondary 12 at point 220. The connection is made through a coupling capacitor 221 and a shielded cable having a conductor 222 and a surrounding conductive shield 223 which is connected to ground through a resistor 224. The conductor 222 is connected to switch blade 108 which is now in engagement with contact 215 and through this contact back to the shield through a capacitor 226. Also connected between the conductor 222 and the shield are a resistor 227 and a further capacitor 228. The resistor 227 and capacitor 228 form with the resistor 224 a voltage divider, the voltage measured being that portion of the total voltage appearing between central conductor 222 and ground that appears across the portion of the divider including resistor 227 and capacitor 228. This portion of the voltage divider when switch blade 108 is in engagement with contact 215 also includes the capacitor 226.

The conductor 222 of the shielded cable is also connected through a conductor 230 to contact 216 which is now engaged by switch blade 110. Switch blade 110 in turn leads to one of the input terminals of an amplifier and integrator 231. The shield 233 surrounding conductor 222 is connected to the other input terminal of this amplifier-integrator by conductors 232 and 233 leading from the shield to this other input terminal.

The amplifier and integrator 231 is a device for smoothing, amplifying and integrating the various voltage pulses existing across a secondary 12 of the ignition transformer 10. Such amplifiers and integrators are conventional. The resultant output of the amplifier and integrator is connected through conductors 235 and 236 to the switch contacts 217 and 218 which, as previously explained, are now connected across the meter 163. It will be fairly obvious that a portion of the voltage appearing across the secondary winding 12 is applied to the input of amplifier 231 where it is filtered, amplified and integrated so as to give a resultant voltage indicative of the average voltage existing across coil 12 during those periods in which the spark plugs would normally be firing. The importance of this reading is that it gives an over-all indication of the condition of the spark plugs. This voltage is read off on meter 163 which in suitably calibrated in terms of kilovolts of voltage.

APPARATUS FOR MEASURING INDIVIDUAL VOLTAGES

When it is desired to measure the voltage across any one selected spark plug, the knob 106 of selector switch 105 is turned to its extreme clockwise position, that is, the position in which the pointer of knob 106 is opposite the legend "KV Indv." In this position, switch blades 108, 109, 110, 114 and 115 are in engagement with contacts 240, 241, 242, 243 and 244, respectively. Switch blades 114, and 115, as previously explained, are connected across the meter 163. The contacts 243, and 244, with which they are now in engagement, are connected to contacts 217 and 218 and through conductors 235 and 236 to the output of the amplifier and integrator 231. Thus, just as with the operation where the average k.v. was being measured, the output of the amplifier and integrator 231 is connected across the meter 163. The primary difference in the apparatus used for measuring individual voltage, as distinguished from that used for measuring average voltage, is that means are provided for preventing the input signal from being applied to the amplifier and integrator except during those cycles in which the desired cylinders are in the firing portion of their cycle. Basically, this function is provided by connecting a field effect transistor 250 across the input of the amplifier and integrator. It will be recalled that when the test selector switch 105 was in the position calling for average k.v. measurement, the conductor 222 leading from the top of secondary 212 was connected through conductor 230, contact 216 and switch blade 110 to the input terminal of the amplifier. This connection did not involve the field effect transistor 250. When, however, the test selector switch 105 is in the position for individual k.v. measurement, the connection of the conductor 222 to the input of amplifier and integrator 231 is through switch blade 108, contact 240, conductor 252, resistor 253, conductor 254, switch contact 242 and switch 110 to one of the input terminals of the amplifier and integrator. It will be noted that the field effect transistor 250 is connected between conductor 254 in the circuit just traced and the conductor 233 which leads to the other input terminal of the amplifier and integrator. Thus, the field effect transistor is directly connected across the input terminals and acts normally to shunt any input signal going to the amplifier and integrator. When, however, a positive voltage is applied to the gate electrode 256 of the field effect transistor 250, the field effect transistor is rendered nonconductive and no longer acts as a shunt. In order to apply this positive voltage to the gate electrode 256, a connection is provided between the gate electrode 256 and the conductor 65 which is selectively connected to the outputs of the various stages of the ring counter. This connection may be traced as follows: from conductor 65 through conductor 258, switch contact 241, switch blade 109, and conductor 259 to the gate electrode 256. Whenever one of the switches 66–73 is closed to apply the output signal of one of the stages to conductor 65, this output signal is also applied to the gate electrode 256 to render the field effect transistor nonconductive. This, in turn, removes the shunt across the input terminals of the amplifier and integrator 231 permitting the voltage derived from the secondary 12 to be applied to the amplifier and integrator to produce a voltage across the meter 163 indicative of the voltage then existing across the secondary. Since this voltage is indicative of the particular spark plug or igniter of the cylinder then ready to be fired, it is possible to individually measure the voltage across each spark plug and hence to [determined] *determine* the condition of the plug.

CONSTRUCTION OF THE RING COUNTER

Figure 3:
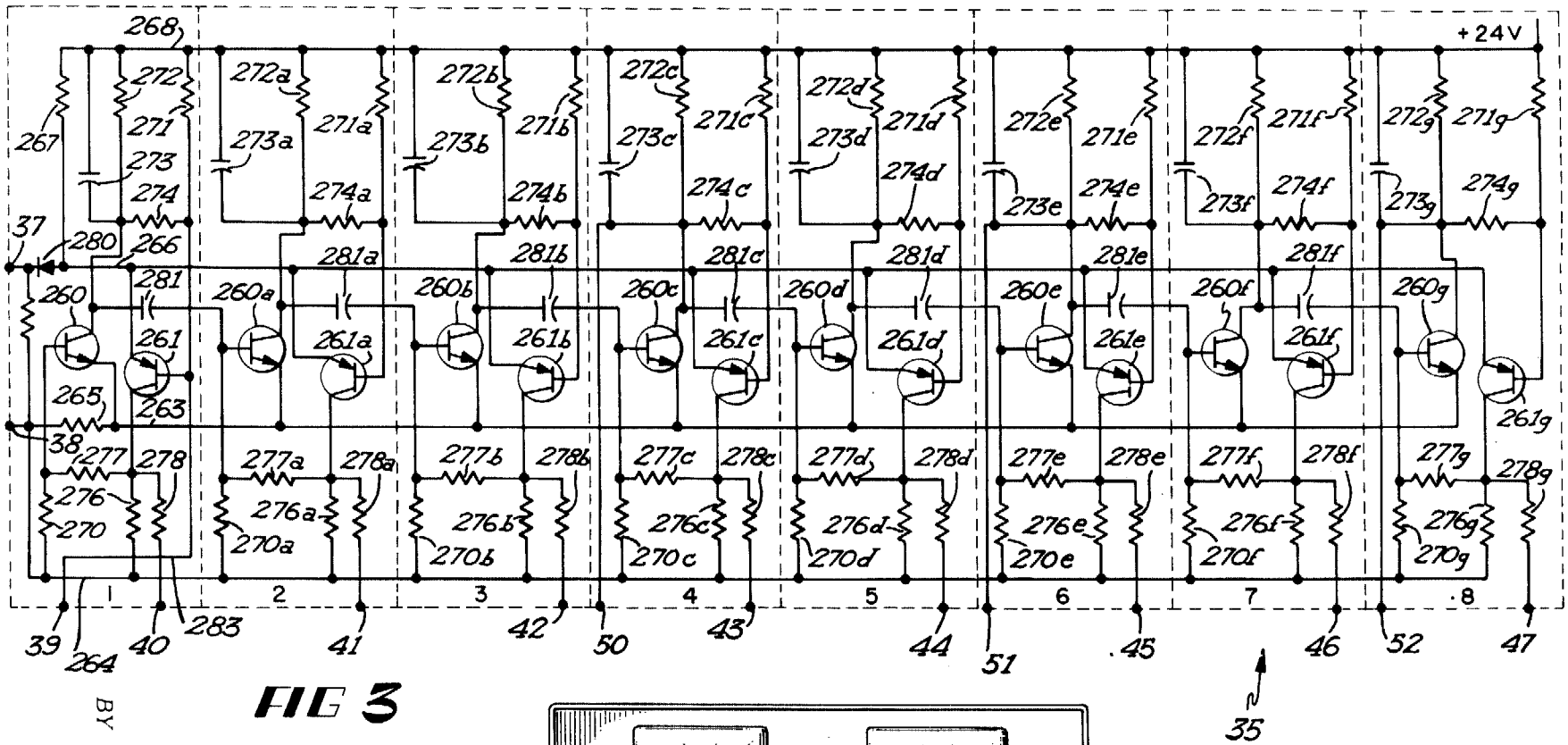
FIG. 3 is a schematic view of the ring counter employed in my apparatus.

In the foregoing description, the general operation of the ring counter 35 was referred to generally but was not described in detail. In FIG. 3, I have shown schematically the various stages of the ring counter. The input terminals 37 and 38, the reset input terminal 39, the output terminals 40, 41, 42, 43, 44, 45, 46 and 47 are the same as in FIG. 1. Similarly, the auxiliary output terminals 50, 51 and 52 of stages 4, 6 and 8 are the same as in FIG. 1.

Referring first to stage 1, this stage, like all of the other stages, comprises an NPN transistor 260 and a PNP transistor 261. The emitters of the NPN transistors of all the stages are connected to a common conductor 263, which, in turn, is connected to a ground conductor 264 through a resistor 265. Similarly, the emitters of all of the PNP transistors, including transistor 261, are connected to a common conductor 266 which, in turn, is connected through a resistor 267 to the positive conductor 268 extending to the positive terminal of the source of voltage supply, for example, the positive terminal of a 24-volt DC voltage source. The base of the NPN transistor 260 is connected to the ground conductor 264 through a resistor 270 and the base of the PNP transistor is similarly connected to the positive supply conductor 268 through a resistor 271. The collector of the NPN transistor 260 is connected to positive supply conductor 268 through a resistor 272 connected in parallel with a capacitor 273. The lower terminals of resistors 271 and 272 are connected together with a cross-coupling resistor 274. The collector of PNP transistor 261 is connected to the ground conductor 264 through a resistor 276 and the upper ends of resistors 270 and 276 are connected together through a cross-coupling resistor 277. The upper end of resistor 276 in the collector circuit of transistor 261 is connected to the output terminal 40 through a resistor 278.

The grounded input terminal 38 is connected to ground conductor 274 and the upper input terminal 37 is connected to the emitter of transistor 261 through a rectifier 208 which is so poled that only negative pulses are transmitted to the emitter of transistor 261.

The various stages are all substantially identical with a few minor distinctions which will be discussed. In order to enable a ready comparison of the stages, the transistors corresponding to transistor 260 have been given reference numerals 260a–260g. Similarly, the corresponding PNP transistors have been identified by numerals 261a–261g. Where it has been necessary to identify other corresponding elements in the subsequent stages, they likewise have been identified by the corresponding numbers followed by one of the subscript letters a–g.

Before describing the operation of the ring counter, the values employed for the components in the typical unit will be given to enable a better understanding of the relative effect of the resistors. A typical unit employed a 2N3566 NPN transistor for transistor 260 and a 2N3638 transistor for PNP transistor 261. The resistors 265 and 267 each had a resistance value of 2.2 kilohms. The resistors 270, 271, 274 and 277 each had a value of 27 kilohms. Resistors 272, 276 and 278 each had a value of 15 kilohms. The rectifier employed was a 10D2 diode.

The collector of transistor 260 is connected to the base of the next NPN transistor 260a in the next stage through a .005 mfd. capacitor 281.

Referring now to the operation of the ring counter, let it be assumed that a negative signal is applied to the reset terminal 39. This reset terminal is connected by a conductor 283 to the base of the transistor 261. The application of this negative signal with respect to ground causes the potential of the base to be lowered with respect to the emitter to, in turn, cause transistor 261 to become conductive. The resultant current flow through resistor 276 in series with the collector of transistor 261 raises the potential of the upper terminal of resistor 276 with respect to ground. Through the coupling resistor 277, this positive potential is, in turn, transmitted through to the base of transistor 260 to, in turn, raise the base potential of this transistor with respect to the emitter to cause this transistor to become conductive also. The two transistors are now both conductive. The current flow through transistor 260 causes a voltage drop to be produced across resistor 265 of such polarity that the conductor 263 to which the emitters of all of the NPN transistors 260–260g are connected is positive with respect to ground. This tends to cause all of the emitters of the NPN transistors to be increased with respect to ground and to tend to bias them all to cutoff. Similarly, the current flow through the PNP transistor 261 causes a voltage drop across resistor 267. As pointed out previously, the emitters of all the PNP transistors are connected to the lower terminal of resistor 267 which now is substantially negative with respect to the positive supply conductor 268 to which the bases of the same transistors are connected. Thus, all of the PNP transistors of the other stages will be biased to cutoff. Because transistors 260 and 261 are already conducting and are held conductive by the voltage drops across resistors 270 and 271, this stage continues to conduct. A positive voltage across resistors 276 appears across the output terminal 40.

Now let it be assumed that a negative pulse is applied to terminal 37 from the output of the square wave generator 60 as a result of the closing of the contacts 16 and 17. This negative pulse is transmitted to the emitter of transistor 261. This negative pulse added to the negative voltage already existing across 267 is sufficient to turn off transistor 261. This, in turn, causes the voltage drop to cease across resistor 276. This drop in the potential of the output terminal of resistor 276 results in a positive voltage no longer existing at output terminal 40. At the same time, the drop in the potential of the upper end of resistor 276 is transmitted through to the base of transistor 260 to, in turn, cause this transistor to turn off. As soon as this transistor turns off, the potential of the collector moves abruptly in a positive direction. This rise in potential of the collector is transmitted through capacitor 281 to the base of the next NPN transistor 260a. The capacitor 281, it will be recalled, is a relatively small capacitor so that a fair amount of time is required for this to take place, the time constant of this circuit including the capacitor being larger than the duration of the pulse applied to terminal 37. The application of the positive pulse to the base of transistor 260a causes this transistor to turn on to, in turn, cause current flow through resistor 272a which results in a voltage drop transmitted through resistor 274a to the base of the other transistor of the second stage, namely the PNP transistor 261a. The lowering of the base of this transistor through the connection just traced results in this transistor also turning on. Due to the fact that the time constant of the connection including the capacitor 281 is longer than the duration of the pulse applied to transistor 37, the pulse will no longer be present to tend to turn off transistor 261a at the time it is turned on in the manner just described. If the time constant of the transverse circuit were not longer than the duration of the pulse, the turning on of transistor 261a would be hindered by the continued presence of the negative pulse applied through terminal 37 to the emitter of transistor 261a.

The effect of the action just discussed is that now the transistors of the second stage are both turned on and the transistors of all of the other stages are turned off. A voltage now exists across resistors 276a and this voltage likewise appears across output terminal 41. The second stage will remain conductive until the next pulse is received at terminal 37. This pulse, being negative, will now turn off the transistor 261a which, in turn, through the action described in connection with the first stage will result in transistor 260a being turned off to abruptly raise in a positive direction the potential of the collector of transistor 260a. This rise in positive potential will, in turn, be transmitted through capacitor 281a to the base of transistor 260b to turn on this transistor and hence to turn on transistor 261b. It will readily be apparent from the foregoing description that each time that a pulse is applied to terminal 37, the stage then conductive ceases to be conductive and the next stage becomes conductive. This action continues until such time as a reset pulse is applied to terminal 39 of stage 1. The application of this negative reset pulse to terminal 39 will turn on transistor 261 and hence transistor 260 to, in turn, cause both of these transistors to become conductive and through the effect of the voltages produced across the common emitter-resistors 265 and 267 to cause the remaining stages to turn off.

It will be noted, as previously referred to, in the desciption of FIG. 1, that stages 4, 6 and 8 are provided with further output terminals 50, 51 and 52. As will be noted, each of these output terminals is connected to the lower terminal of the resistor between the positive bus conductor 268 and the emitter of the NPN stage. In other words, terminals 50, 51 and 52 are connected to the lower terminals of resistors 272c, 272e and 272g, respectively. When the transistor stage is turned off, this lower terminal is substantially at the potential of the positive bus conductor 268. Whenever the stage is turned on, however, the potential of this drops abruptly. Thus, whenever any of stages 4, 6 or 8 is conductive, the associated terminal 50, 51 or 52 has its potential abruptly decreased. As explained previously, this drop in potential is applied to the square wave generator 98 to produce a negative pulse signal which, in turn, is applied to the reset terminal 39 to reset the ring counter when the normal signal from the No. 1 spark plug is not available due to this plug being rendered inoperative for test purposes.

OVER-ALL OPERATION

Briefly summarizing the operation of the apparatus, the ring counter 30 is effective at all times to identify the particular cylinder whose igniter would normally be fired. This is accomplished by applying a reset voltage to terminal 39 of the first stage of the ring counter when a selected plug is ready to be fired, such as the plug for the No. 1 cylinder indicated in the drawing by the reference character 24. Each time that the ignition points are closed, a pulse is applied through the square wave generator 60 to the input terminals 37 and 38 to advance the output of the ring counter from one stage to the next stage. As pointed out in connection with the description of FIG. 3, this is done by rendering the transistors of one stage nonconductive and the transistors of the next stage conductive. The result is that there successively appears across the output terminals 40–47 a positive voltage which can be selectively applied to the conductor 65 by closing one or more of the switches 66–73. The effect of this positive voltage which lasts from the time that the points 16 and 17 initially close until they reclose after being open, can be employed in various ways. Essentially, the ring counter acts as a cylinder identifying means which is effective regardless of the speed at which the engine is operated and regardless of how many cylinders there are in the engine.

The advantage of the positive voltage lasting from "points-closed to points-closed" conditions, rather than from "points-open to points-open" conditions is that certain effects being initiated or measured by this signal occur at the time the points open. Thus, where a spark plug is to be shorted out, it is desirable to initiate the shorting action substantially at the time the points close rather than at the time the points open. If the apparatus waited until the points open to short the plug, the plug may have already started to fire before the plug was shorted out. Similarly, when the voltage across the individual plug is being measured, a more accurate reading is obtained if the initiation of the measurement begins while the points are still closed than after the points open and the voltage has already started to build up. Thus, the initiation of the positive voltage at the points-closed condition has a decided advantage in connection with this apparatus.

Turning to the test that can be performed, when the power selecting switch 105 is in the position shown, that is in which the knob 106 is set for the "Power Check" position, the voltage applied to conductor 65 is applied through a Schmitt trigger circuit and an amplifier to the trigger electrode of a silicon controlled rectifier 140 which is effectively connected across the ignition points. Thus, when the silicon controlled rectifier is rendered conductive while the points are open by the application of the pulse derived from the ring counter, the points are effectively shorted out so that no pulse is applied to the spark plug which would normally fire during that particular portion of the cycle. In order to take care of the case where the spark plug to be shorted out is the plug from which the reset pulse is derived, there is an additional means for resetting the ring counter based upon the number of cylinders in the engine being tested. This is a further cylinder selector switch 79 controlled by a knob 80 which may be set for either 4, 6 or 8 cylinders depending upon the number of cylinders in the engine being tested. Whenever the engine completes a cycle, the pulse of the final stage corresponding to the last cylinder to be applied is used as an auxiliary reset pulse to reset the ring counter. Thus, even though the plug which is normally employed to provide the reset voltage is being shunted out, the ring counter continues to be reset at the end of each cycle.

If the knob 106 of the test selector switch is turned to dwell average position indicated by the legend "Dwell Avg.", the signal across the ignition points is applied through conductor 164 to a network of resistors and capacitors and through a transistor 170 to a capacitor 180 so that capacitor 180 assumes a charge dependent upon the length of time that the ignition switch comprising ignition points 16 and 17, is closed.

Let it be assumed now that it is desired to measure the dwell occurring the firing portion of the operation of one cylinder. Under these conditions, the knob 106 is changed to the position indicated by the legend "Dwell Indv." In this position, the transistor 170 which controls the charging of the capacitor 180 connected across the dwell kv. meter 163 has its base connected through the collector switch blade 112 on contact 191 to the conductor 129 normally at relatively positive potential. The effect of this connection through a resistor 127 is to normally maintain the transistor 170 fully conductive regardless of the voltage appearing across the ignition points. When, however, the selected cylinder is to be fired and one of the switches 66–73 is closed, the potential applied to conductor 65 through the input stage of the Schmitt trigger causes this stage to turn on to cause a substantial voltage drop across resistor 127 so that the base potential of transistor 170 is lowered sufficiently to permit this transistor to be controlled in accordance with the potential across the points 16 and 17. Thus, during the dwell-individual test, the transistor is effectively continuously turned on except during the cycle in which it is desired to observe the dwell. Thus, the voltage appearing across meter 163 under these conditions is determined purely by the length of the dwell during the firing cycle of one particular cylinder.

When it is desired to measure the average voltage across the plugs, the knob 106 of the selector switch is turned to the position indicated by the legend "KV Avg." In this position, the voltage across the secondary coil is applied through an amplifier and integrator to the dwell and k.v. meter 163. The meter 163 under these conditions indicates the average of the voltages appearing across the plugs for a complete engine cycle.

When it is desired to measure the voltage appearing across any one plug, the selector switch is turned to the position indicated by "KV Indv." Under these conditions, the field effect transistor 250 is connected across the input to the amplifier 231. This field effect transistor is normally conductive and acts as a shunt across the input terminals of the amplifier and integrator 231. When, however, the particular cylinder being tested is in firing position, the voltage applied to the conductor 65 by the ring counter through the selected one of the switches 66–73 is effective to apply a pulse through conductor 258 and the selector switch 109 to the gate electrode of the field transistor to turn this transistor off during that part of the cycle. The signal derived from the voltage across the secondary winding of the ignition coil is then passed through to the amplifier and integrator so that the output signal supplied by this to the meter 163 is dependent upon the voltage existing across a single selected plug.

Since the application of the signal to the meter is initiated at the time that the points first close and continues until the points have opened and reclosed, it is obvious that the meter will respond to the voltage across the plug for the complete duration of that voltage.

The pulse derived from across the plug, after being passed through a square-wave generator, are employed to operator a tachometer 150 which is calibrated in terms of revolutions per minute. Thus, it is possible at all times during the various tests to observe the speed of the engine and the effect on the engine of such tests as the [power check] "*Power Check*" test. It will be seen that I have provided in a single compact piece of apparatus means for selectively performing any of various tests on the engine regardless of the speed at which the engine is operated and which tests can be performed either in connection with any one particular cylinder or in connection with the over-all average operation of the engine.

I claim as my invention:

1. An analyzer for multicylinder internal combustion engines of the type having an electrical igniter for each cylinder, electrical ignition pulse generating means and a distributor for sequentially applying each generated ignition pulse to the igniter of a different cylinder in a predetermined sequence, said analyzer being usable with engines having different numbers of cylinders and comprising:

a first coupling circuit for producing discrete pulses at its output coincident with the application thereto of discrete input signals, a first connector for coupling the input of said first coupling circuit to the electrical ignition pulse generator to receive signals at the frequency of generation of said ignition pulses, a second coupling circuit producing discrete pulses at its output coincident to the application thereto of discrete input signals, a second connector for coupling the input of the second coupling circuit to the igniter of an individual cylinder to receive signals at the frequency of firing of said cylinder, a pulse counter having a plurality of stages corresponding to the maximum number of cylinders of any engine to be tested, each stage having an output connection, said counter having a first input connection and means operative upon successive pulses being applied to said input connection to cause an output signal to appear successively at the output connection of successive stages, said counter having a second intput connection, and means operative when a signal is applied to said second input connection to reset said counter to cause the output signal to appear at the output connection of the first stage regardless of whether an output signal has yet appeared at the output connections of all of said stages, means for connecting said first input connection to the output of said first coupling circuit to cause said output signal to advance at the frequency of generation of said ignition pulses from one stage to the next stage, means for connecting said second input connection to the output of said second coupling circuit so that the counter is reset each time that an ignition pulse would normally be applied to the igniter of the individual cylinder to which the input of said second coupling circuit is connected, electrical testing means adapted to be controlled by the output signal of said counter and effective when a signal is applied thereto to produce an electrical effect useful in the analysis of the performance of the engine, and switching means for selectively connecting said electrical testing means to the output connection of any one selected stage of said counter so that said testing means is operative to produce such an electrical effect concurrently with the period during which the generated pulse would normally be applied to the igniter of any selected cylinder.

2. The analyzer of claim 1 in which the electrical testing means is effective to indicate the voltage existing across any selected igniter.

3. The analyzer of claim 1 in which the electrical testing means may selectively indicate either the voltage across any selected igniter or the average voltage across all of the igniters.

4. The analyzer of claim 1 for use with an engine in which the electrical ignition pulse generating means comprises an ignition switch which is opened and closed for periods of time in connection with the generation of an ignition pulse and in which analyzer the electrical testing means is effective to indicate the "dwell" or the length of time the switch is closed.

5. The analyzer of claim 4 in which the electrical testing means may selectively indicate either the "dwell" in connection with the igniter of any one cylinder or the average "dwell" during a complete cycle of the engine.

6. The analyzer of claim 1 in which said switching means is adapted to connect said electrical testing means simultaneously to a plurality of selected output connections of said cylinder identifying means so that said electrical effect is produced whenever the ignition pulse would normally be applied to the igniters of certain selected cylinders.

7. The analyzer of claim 1 in which the electrical testing means is effective to render any selected igniter ineffective and in which the analyzer includes means for observing the effect on engine operation of said igniter being rendered ineffective.

8. The analyzer of claim 1 in which the means for observing the effect on engine operation of said igniter being rendered ineffective comprises an engine speed indicator controlled by the pulse generating means.

9. The analyzer of claim 1 in which said pulse counter is an electronic ring counter in which each successive pulse applied to said first input connection renders one stage nonconductive and the next succeeding stage conductive.

10. The analyzer of claim 1 in which the electrical testing means is effective to render any selected igniter ineffective and in which, when said igniter coupled to the input of said second coupling circuit is being rendered ineffective for testing purposes, auxiliary reset means are provided for applying a reset pulse to said second input connection independently of the connection of said second coupling circuit to said igniter.

11. The analyzer of claim 10 in which the auxiliary reset means comprises means connected to said counter and effective to apply said reset pulse when the counter indicates that the number of cylinders which have operated corresponds to the total number of cylinders in the engine.

12. The analyzer of claim 1 for use with an engine in which the electrical ignition pulse generating means comprises an ignition switch which is closed and opened for periods of time in connection with the generation of an ignition pulse which is initiated upon the opening of said switch and in which the output signal successively applied to each output connection of said [cylinder identifying means] *pulse counter* is initiated at the time that said switch is first closed and continuous until after said switch opens.

13. The analyzer of claim 12 in which the output signal successively applied to each output connection of said [cylinder identifying means] *pulse counter* begins when said switch is first closed and continues until said switch recloses after being opened.

14. A compression and ignition test circuit for an automotive type engine; said engine including a plurality of cylinders and an ignition circuit connected to said cylinders including an igniter for each cylinder and a pair of distributor points, said compression and ignition test circuit including high speed switching means operable between an open and closed circuit condition, means for operatively connecting said switching means across the distributor points to cause the points to be short-circuited each time that said switching means is closed, operating means connected to said high speed switching means and energizable to cause said high speed switching means to assume a closed circuit condition for a predetermined interval less than the time interval between subsequent closings of said distributor points; energizing means having input and output terminals, means for operatively connecting the input terminals of said energizing means to the distributor points, said energizing means having its output terminals connected to said operating means and effective to cyclically energize said operating means in synchronism with a preselected number of operations of said distributor points whereby said energizing means eenergizes said operating means after a predetermined number of operations of said distributor points thereby to close said high speed switching means to short-circuit said distributor points in a predetermined repetitive pattern to continually disable the operation of at least one cylinder of said engine; means connected to said energizing means and responsive to the energization of one of said igniters for initiating each cycle of said energizing means so that the time of energization of said operating means is related to the time of firing of the igniter of a predetermined selected cylinder; and a cylinder selection switching means connected between said energizing means and said operating means for varying said predetermined repetitive pattern for the selection of a different selected cylinder for disabling other than said at least one selected cylinder.

15. The device as set forth in claim 14 wherein said cylinder selection switching means includes cylinder selecting switches for at least one-half of the cylinders in said engine.

16. A compression and ignition test circuit for an automotive type engine; said engine including a plurality of cylinders and an ignition circuit connected to said cylinders including an igniter for each cylinder and a pair of distributor points; said test circuit including: a controlled rectifier having an anode and cathode terminals connected across said distributor points and a gate terminal; a pulse generator having input terminals connected to said distributor points and an output circuit connected to said gate terminal of said controlled rectifier; said pulse generator cyclically generating one output pulse in synchronism with a predetermined number of opening operations of said distributor points; means connected to said pulse generator and responsive to the energization of one of said igniters for initiating each cycle of said pulse generator so that the timing of said output pulse is related to the time of firing of the igniter of a predetermined selected cylinder; and pulse advancing means for shifting the point in the pattern of distributor point operation at which said one output pulse is generated and hence the particular cylinder whose timing of firing is being sensed.

17. The device as set forth in claim 16 wherein said pulse generator comprises a ring counter having a pair of input terminals and a plurality of output terminals, there being at least one output terminal for each of said igniters; said pair of input terminals being connected across said distributor points; said pulse advancing means comprising switching means for selectively connecting one of said output terminals to said gate terminal of said controlled rectifier.

18. The device as set forth in claim 16 wherein said pulse generator comprises a ring counter having a pair of input terminals and a plurality of output terminals, there being at least one output terminal for each of said igniters; means connected across the distributor points and connected to said pair of input terminals for applying to said input terminals at the time that the distributor points first open a pulse which causes said ring counter to shift the portion of the cycle at which said output pulse occurs; and said pulse advancing means comprising switching means for selectively connecting one of said output terminals to said gate terminal of said controlled rectifier.

*19. In an apparatus for analyzing the operation of a multiple cylinder internal combustion engine having an ignition time interval for each cylinder during which ignition normally occurs, the combination which comprises:*

*means coupled to the engine for generating a first control pulse in response to the ignition time interval for each of the cylinders,*

*means responsive to each occurrence of the first control pulse for providing a second control pulse which occurs at a time following the initiation of the first control pulse by a time period which is directly proportional to the interval between the successive times of cylinder ignition,*

*means responsive to each occurrence of the second control pulse for generating anticipatory ignition suppression signals in advance of the ignition times in respective cylinders, and*

*means coupled to the engine and responsive to the ignition suppression signals for suppressing the ignition in a selected cylinder.*

*20. The combination as defined in claim 19 wherein the means for generating the ignition suppression signals includes:*

*a multistage ring counter having a stage individually associated with each cylinder,*

*means coupled to the engine and responsive to the ignition of the first cylinder thereof for resetting the stages of the ring counter, and*

*means for advancing the count in the ring counter in response to the occurrence of each second control pulse.*

*21. The combination as defined in claim 19 including means coupled to the number one cylinder of the engine and to the suppression signal generating means for generating a third control pulse which corresponds to the firing time of the first cylinder.*

*22. The combination as defined in claim 19 including means responsive to the first control pulse for providing an indication of engine r.p.m., whereby the power contribution of individual cylinders can be ascertained when the ignition in each of the cylinders is suppressed.*

*23. Apparatus for analyzing the functioning of a multiple-cylinder internal combustion engine having an ignition coil, comprising:*

*means for picking up ignition pulses from said ignition coil;*

*pulse shaping means connected to said ignition pulse pickup means for producing a first control pulse therefrom upon each occurrence of an ignition pulse;*

*means responsive to each first control pulse for providing a second control pulse which occurs at a time following the initiation of the first control pulse by a time period which is directly proportional to the interval between successive ones of the ignition pulses;*

*means connected to the first cylinder of said multiple-cylinder engine for producing a third control pulse whenever the first cylinder fires;*

*a multi-stage ring pulse counter having stages equal in number to the number of cylinders in said engine;*

*reset means responsive to the third control pulse to place all of the stages of the pulse counter in a reset condition;*

*means for incrementally advancing the counter in the ring pulse counter with the occurrence of each of the second control pulses; and*

*utilization means connected to the output of the stages of the ring pulse counter and responsive to the pulse count therein.*

*24. In a system for diagnosing an engine including a source of periodic cycles of ignition signals, improved apparatus for preventing one or more predetermined ignition signals in each cycle from energizing engine components which are normally energized by said predetermined ignition signals comprising in combination:*

*input means for receiving said periodic cycles of ignition signals from said source;*

*generating means for generating a clock pulse in response to the receipt of each ignition signal by the input means, said generating means comprising clock means for producing in response to each ignition signal a clock pulse having a predetermined amplitude and having a duration proportional to the duration of the ignition signal;*

*counting means for producing counting states representative of the number of pulses received from said generating means;*

*adjustable resetting means for resetting the counting means to a predetermined counting state after the counting means has counted through a predetermined number of counting states;*

*removable setting means for setting the counting means to an initial counting state in response to the operation of a predetermined one of the engine components by an ignition signal;*

*adjustable selecting means for producing a disabling pulse in response to a predetermined counting state of the counting means; and*

*disabling means responsive to the disabling pulse for preventing any simultaneously-occurring ignition signal from energizing the engine component normally energized by the simultaneously-occurring ignition signal.*

*25. In a system for diagnosing an engine including a source of periodic cycles of ignition signals, improved apparatus for preventing one or more predetermined ignition signals in each cycle from energizing engine components which are normally energized by said predetermined ignition signals comprising in combination:*

*input means for receiving said periodic cycles of ignition signals from said source;*

*generating means operatively connected to the input means for generating a clock pulse in response to the receipt of each ignition signal by the input means;*

*counting means operatively connected to the generating means for producing counting states representative of the number of pulses received from said generating means, said counting means comprising first, second and third binary flip-flop circuits each having an input circuit and an output circuit and each capable of producing a single output pulse for each two pulses transmitted to its input circuit;*

*adjustable resetting means operatively connected to the counting means for resetting the counting means to a predetermined counting state after the counting means has counted through a predetermined number of counting states;*

*removable setting means operatively connected to the counting means for setting the counting means to an initial counting state in response to the operation of a predetermined one of the engine components by an ignition signal;*

*disabling means operatively connected to the selecting means and responsive to the disabling pulse for preventing any simultaneously-occurring ignition signal from energizing the engine component normally energized by the simultaneously-occurring ignition signal.*

* * * * *